(12) United States Patent
Choi et al.

(10) Patent No.: US 12,130,466 B2
(45) Date of Patent: Oct. 29, 2024

(54) DISPLAY APPARATUS

(71) Applicant: SAMSUNG ELECTRONICS CO., LTD., Suwon-si (KR)

(72) Inventors: Sungpil Choi, Suwon-si (KR); Yonghwan Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/526,925

(22) Filed: Dec. 1, 2023

(65) Prior Publication Data
US 2024/0248251 A1 Jul. 25, 2024

Related U.S. Application Data

(63) Continuation of application No. PCT/KR2023/018265, filed on Nov. 14, 2023.

(30) Foreign Application Priority Data

Jan. 20, 2023 (KR) .................... 10-2023-0008914

(51) Int. Cl.
*F21V 8/00* (2006.01)
(52) U.S. Cl.
CPC ......... *G02B 6/0085* (2013.01); *G02B 6/0068* (2013.01); *G02B 6/009* (2013.01)
(58) Field of Classification Search
None
See application file for complete search history.

(56) References Cited

U.S. PATENT DOCUMENTS

| 8,616,752 B2 | 12/2013 | Yu |
| 9,322,982 B2 | 4/2016 | Yu |
| (Continued) | | |

FOREIGN PATENT DOCUMENTS

| JP | 2014-149386 A | 8/2014 |
| JP | 2014-170079 A | 9/2014 |
| (Continued) | | |

OTHER PUBLICATIONS

KR101054768B1 (Year: 2011).*
(Continued)

*Primary Examiner* — Lucy P Chien
(74) *Attorney, Agent, or Firm* — Sughrue Mion, PLLC

(57) ABSTRACT

A display apparatus includes: a liquid crystal panel configured to display an image; a light guide plate provided behind the liquid crystal panel in a first direction; a light source module adjacent to a side surface of the light guide plate, the light source module including a plurality of light sources arranged in a second direction perpendicular to the first direction and configured to emit light toward the side surface of the light guide plate; a rear chassis provided behind the light guide plate in the first direction; and a heat dissipation member coupled to the rear chassis and configured to dissipate heat generated by the light source module, wherein the heat dissipation member may include: a first heat dissipation member contacting the light source module; and a second heat dissipation member spaced apart from the first heat dissipation member by a gap in a third direction perpendicular to the first direction and the second direction.

15 Claims, 9 Drawing Sheets

(56) References Cited

U.S. PATENT DOCUMENTS

| | | |
|---|---|---|
| 9,366,805 B2 | 6/2016 | Park et al. |
| 10,247,378 B2 | 4/2019 | Kim |
| 10,580,950 B2 | 3/2020 | Chae et al. |
| 2014/0247620 A1 | 9/2014 | Sasaoka et al. |
| 2015/0098247 A1 | 4/2015 | Shin et al. |
| 2015/0293298 A1* | 10/2015 | Hirota ............... G02B 6/0016 362/607 |
| 2016/0252240 A1 | 9/2016 | Lee |
| 2017/0168222 A1* | 6/2017 | Chen ............... G02B 6/0055 |
| 2018/0143496 A1* | 5/2018 | Hosoki ............... G02B 6/0073 |

FOREIGN PATENT DOCUMENTS

| | | |
|---|---|---|
| JP | 2016-100197 A | 5/2016 |
| KR | 10-2008-0049261 A | 6/2008 |
| KR | 10-0900696 B1 | 6/2009 |
| KR | 10-2011-0109220 A | 10/2011 |
| KR | 10-2012-0005657 A | 1/2012 |
| KR | 10-2012-0026675 A | 3/2012 |
| KR | 10-2015-0040414 A | 4/2015 |
| KR | 10-1807442 B1 | 12/2017 |
| KR | 10-2096400 B1 | 4/2020 |
| KR | 10-2407827 B1 | 6/2022 |
| WO | 2015/186871 A1 | 12/2015 |
| WO | 2016/072605 A1 | 5/2016 |
| WO | 2017/104964 A1 | 6/2017 |
| WO | 2017/116142 A1 | 7/2017 |
| WO | 2017/135683 A1 | 8/2017 |

OTHER PUBLICATIONS

International Search Report (PCT/ISA/210) issued on Mar. 6, 2024 by the International Searching Authority in International Patent Application No. PCT/KR2023/018265.

Written Opinion (PCT/ISA/237) issued on Mar. 6, 2024 by the International Searching Authority in International Patent Application No. PCT/KR2023/018265.

* cited by examiner

DISPLAY APPARATUS

CROSS-REFERENCE TO RELATED APPLICATION(S)

This application is a continuation application of International Application No. PCT/KR2023/018265, filed on Nov. 14, 2023, which claims priority to Korean Patent Application No. 10-2023-0008914, filed on Jan. 20, 2023, in the Korean Intellectual Property Office, the disclosures of which are incorporated by reference herein in their entireties.

BACKGROUND

1. Field

The disclosure relates to a display apparatus including an edge-type backlight unit.

2. Description of Related Art

A display apparatus is a type of output device that converts obtained or stored electrical information into visual information and displays the visual information to a user. The display apparatus is used in various fields such as homes and workplaces.

The display apparatus may include a self-luminous liquid crystal panel or a non-self-luminous liquid crystal panel.

A display apparatus to which the non-self-luminous liquid crystal panel is mounted may include a liquid crystal panel and a backlight unit configured to supply light to the liquid crystal panel.

The backlight unit includes a light source module including a light source and a printed circuit board, and various optical members, and may be classified into a direct type and an edge type according to the position of the light source. The edge-type backlight unit includes a light guide plate (LGP) to guide light emitted from a light source to a liquid crystal panel. The light source module is provided to dissipate heat by using a heat sink plate, and the heat sink plate may undergo physical deformation due to an increase in temperature when the light source generates heat.

SUMMARY

Provided is a display apparatus that may be capable of minimizing distortion of a backlight unit that may occur due to physical deformation of a heat sink plate.

Additional aspects of the disclosure will be set forth in part in the description which follows and, in part, will be apparent from the description, or may be learned by practice of the presented embodiments.

A display apparatus includes: a liquid crystal panel configured to display an image: a light guide plate provided behind the liquid crystal panel in a first direction: a light source module adjacent to a side surface of the light guide plate, the light source module including a plurality of light sources arranged in a second direction perpendicular to the first direction and configured to emit light toward the side surface of the light guide plate; a rear chassis provided behind the light guide plate in the first direction; and a heat dissipation member coupled to the rear chassis and configured to dissipate heat generated by the light source module, wherein the heat dissipation member may include: a first heat dissipation member contacting the light source module; and a second heat dissipation member spaced apart from the first heat dissipation member by a gap in a third direction perpendicular to the first direction and the second direction.

DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
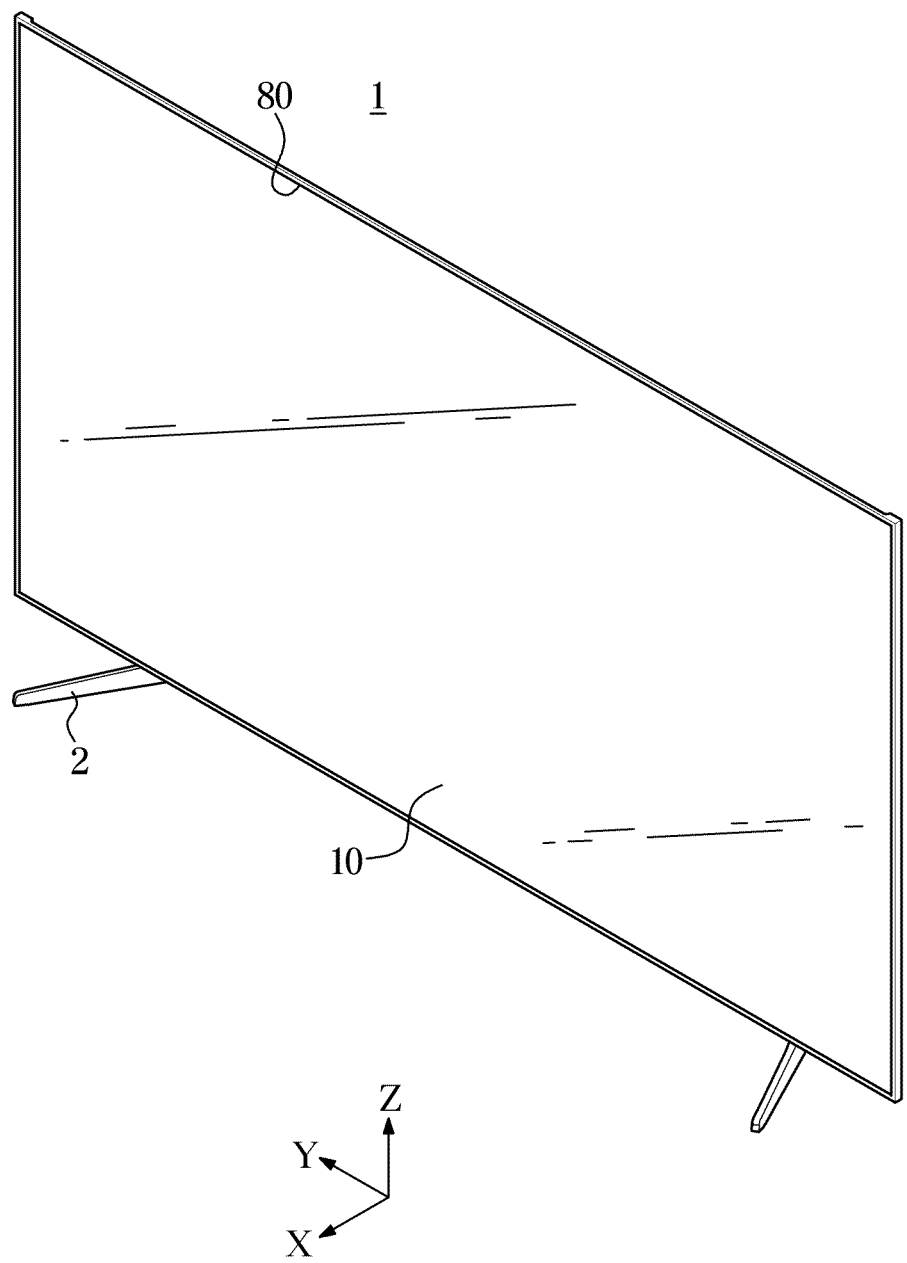
FIG. 1 is a view illustrating an appearance of a display apparatus, according to an embodiment.

The various embodiments and the terms used therein are not intended to limit the technology disclosed herein to specific forms, and the disclosure should be understood to include various modifications, equivalents, and/or alternatives to the corresponding embodiments.

In describing the drawings, similar reference numerals may be used to designate similar constituent elements.

A singular expression may include a plural expression unless they are definitely different in a context.

The expressions "A or B," "at least one of A or/and B," or "one or more of A or/and B," A, B or C," "at least one of A, B or/and C," or "one or more of A, B or/and C," and the like used herein may include any and all combinations of one or more of the associated listed items.

The term of "and/or" includes a plurality of combinations of relevant items or any one item among a plurality of relevant items.

Herein, the expressions "a first", "a second", "the first", "the second", etc., may simply be used to distinguish an element from other elements, but is not limited to another aspect (importance or order) of elements.

When an element (e.g., a first element) is referred to as being "(functionally or communicatively) coupled," or "connected" to another element (e.g., a second element), the first element may be connected to the second element, directly (e.g., wired), wirelessly, or through a third element.

In this disclosure, the terms "including", "having", and the like are used to specify features, numbers, steps, operations, elements, elements, or combinations thereof, but do not preclude the presence or addition of one or more of the features, elements, steps, operations, elements, elements, or combinations thereof.

When an element is said to be "connected", "coupled", "supported" or "contacted" with another element, this includes not only when elements are directly connected, coupled, supported or contacted, but also when elements are indirectly connected, coupled, supported or contacted through a third element.

Throughout the description, when an element is "on" another element, this includes not only when the element is in contact with the other element, but also when there is another element between the two elements.

Reference will now be made in detail to embodiments of the disclosure, examples of which are illustrated in the accompanying drawings.

The description of the disclosure will be described with a flat display apparatus 1 as an example, but the disclosure may be applied to a bendable or flexible display apparatus in which a screen is changed from a curved state to a flat state.

Further, the disclosure may be applied to all display apparatuses 1 regardless of screen size. For example, the disclosure may be applied to products that are capable of being installed on tables, walls, or ceilings, such as smart televisions and monitors, and may be applied to portable products such as tablets, laptops, smart phones, or e-books.

In the following detailed description, the terms of "up and down direction", "lower side", "front and rear direction", and the like may be defined by a direction arrow of FIG. 1, but the shape and the location of the component is not limited by the term.

Figure 2:
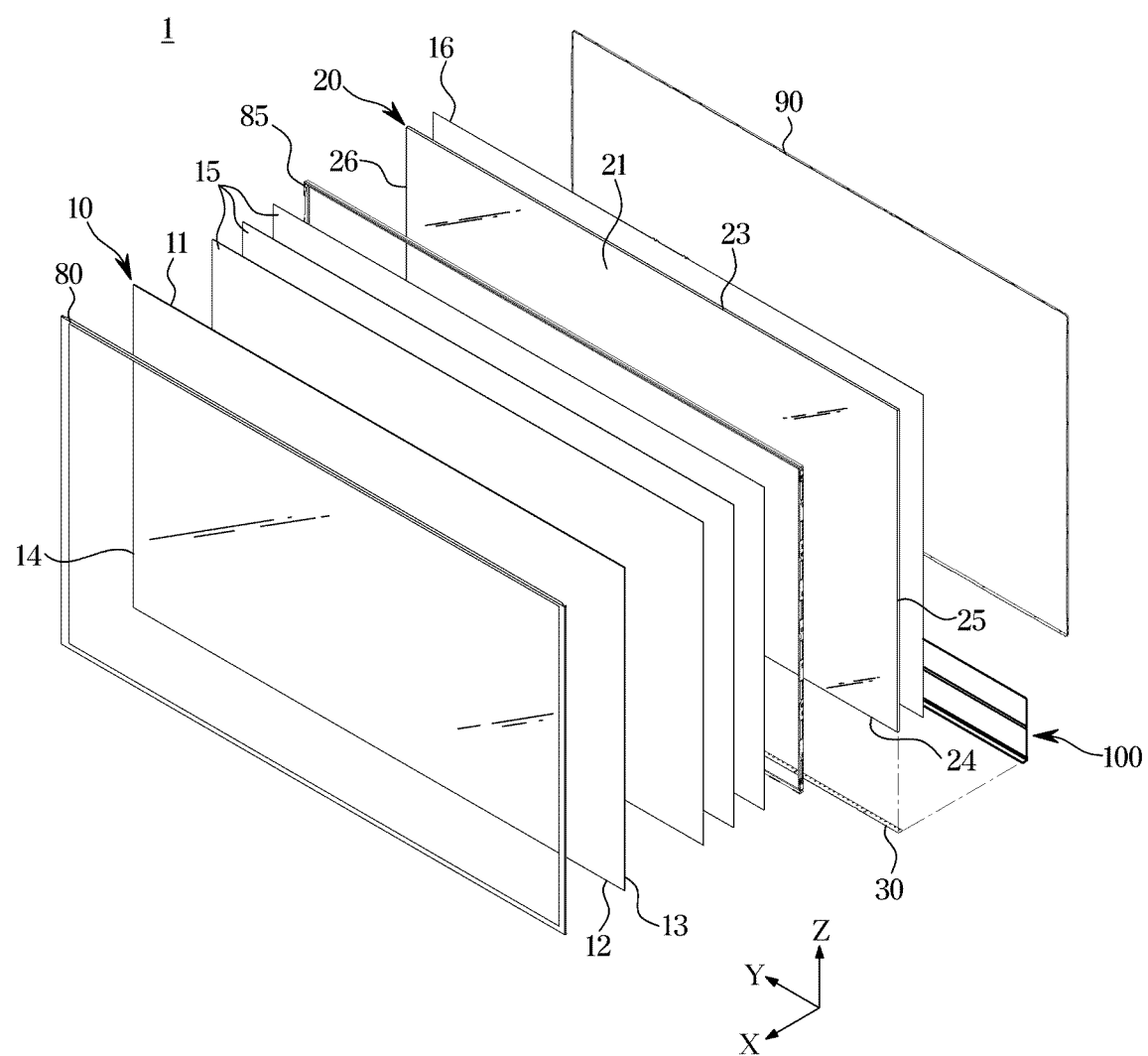
FIG. 2 is an exploded view illustrating a configuration of the display apparatus, according to an embodiment.
Figure 3:
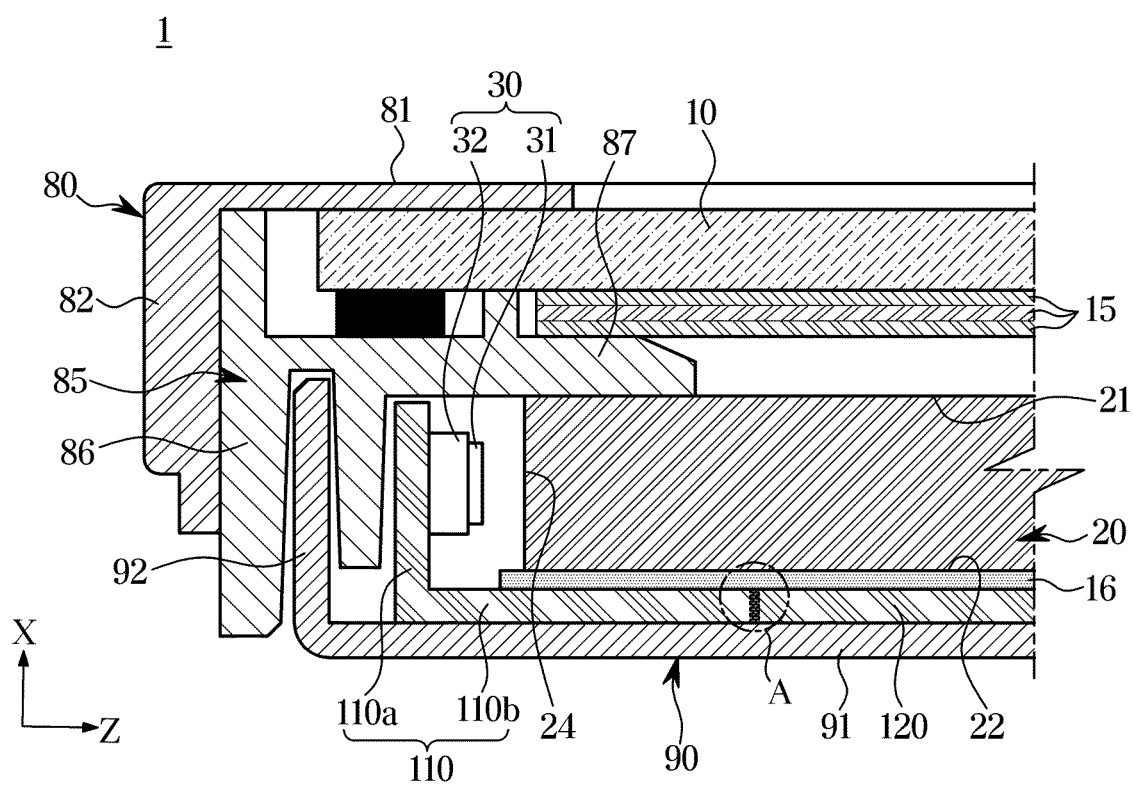
FIG. 3 is a cross-sectional view of the display apparatus, according to an embodiment.

FIG. 1 is a view illustrating an appearance of a display apparatus, according to an embodiment. FIG. 2 is an exploded view illustrating a configuration of the display apparatus, according to an embodiment. FIG. 3 is a cross-sectional view of the display apparatus, according to an embodiment.

Referring to FIGS. 1, 2, and 3, the display apparatus 1 may be installed on a floor surface or on furniture in a standing manner, or may be installed on a wall or inside a wall in a hanging manner. A support leg 2 may be provided at a bottom of the display apparatus 1 such as to be installed on an indoor/outdoor floor surface or on furniture in the standing manner.

The display apparatus 1 may include a liquid crystal panel 10 provided to display an image, a backlight unit configured to emit light toward the liquid crystal panel 10, and a chassis assembly provided to support the liquid crystal panel 10 and the backlight unit.

The liquid crystal panel 10 may display an image using liquid crystal that exhibits optical properties according to changes in voltage and temperature. The liquid crystal panel 10 may include a thin film transistor (TFT) substrate, a color filter substrate coupled to face the TFT substrate, and a liquid crystal injected between the TFT substrate and the color filter substrate.

A screen of the liquid crystal panel 10 may have a substantially rectangular shape. The screen of the liquid crystal panel 10 may include a pair of long sides 11 and 12 and a pair of short sides 13 and 14. The liquid crystal panel 10 may display the screen toward a first direction X corresponding to the front side.

The backlight unit may include a light source module 30 including a light source 31 configured to emit light, and a light guide plate 20 configured to guide the light emitted from the light source 31 to the liquid crystal panel 10.

The light source module 30 may include a printed circuit board 32 on which the light source 31 is mounted. A circuit pattern for transmitting driving power and signals to the light source 31 may be formed on the printed circuit board 32. The light source module 30 may include the light source 31 and the printed circuit board 32. A light emitting diode (LED), a cold cathode fluorescent lamp (CCFL), an external electrode fluorescent lamp (EEFL), or the like may be used as the light source 31.

A plurality of light sources 31 may be provided and may be arranged in a line on the printed circuit board 32 according to an extending direction of the printed circuit board 32. The plurality of light sources 31 may be mounted on the printed circuit board 32 so as to be spaced apart from each other at regular intervals.

The light guide plate 20 may be disposed behind the liquid crystal panel 10. The light guide plate 20 may convert light emitted from the light source 31 into surface light and guide the surface light to the liquid crystal panel 10. The light guide plate 20 may be formed of a polymethyl methacrylate (PMMA) material. Various patterns for changing light paths may be formed on the light guide plate 20.

The light guide plate 20 may have a substantially rectangular parallelepiped shape. That is, the light guide plate 20 may include a front surface 21, a rear surface 22, and four side surfaces 23, 24, 25, and 26. The side surfaces 23, 24, 25, and 26 may include an upper side surface 23, a lower side surface 24, a left side surface 25, and a right side surface 26. Light may be incident to the light guide plate 20 through at least one of the side surfaces 23, 24, 25, and 26 of the light guide plate 20, and light may exit from the light guide plate through the front surface 21 of the light guide plate 20. The light exiting through the front surface 21 of the light guide plate 20 may be guided to the liquid crystal panel 10. Therefore, among the side surfaces 23, 24, 25, and 26 of the light guide plate 20, a surface on which light is incident may be referred to as an incident surface of the light guide plate 20, and the front surface 21 of the light guide plate 20 may be referred to as an exit surface of the light guide plate 20.

For example, the light source 31 may emit light toward the lower side surface 24 of the side surfaces 23, 24, 25, and 26 of the light guide plate 20. For this, the light source 31 may be disposed adjacent to the lower side surface 24 of the light guide plate 20. The printed circuit board 32 may be disposed in a second direction Y corresponding to a left and right direction, such as to be parallel to the lower side surface 24 of the light guide plate 20. The plurality of light sources 31 may be arranged in the second direction Y to be parallel to the lower side surface 24.

For example, the light source 31 may be disposed adjacent to at least one of the side surfaces 23, 24, 25, and 26 of the light guide plate 20 such as to allow light to be incident to the light guide plate 20 through the at least one of the side surfaces 23, 24, 25, and 26 of the light guide plate 20.

When a distance between the light source 31 and the light guide plate 20 changes, the luminance of the display apparatus may change. Therefore, the distance between the light source 31 and the light guide plate 20 needs to be kept constant to allow the luminance of the display apparatus to be kept constant. For this, the display apparatus 1 may include a spacer provided to maintain the distance between the light guide plate 20 and the light source 31.

The backlight unit may include a reflective sheet 16 preventing light loss by reflecting light, and various optical sheets 15 for improving light characteristics.

The reflective sheet 16 may be disposed on a rear surface of the light guide plate 20 to allow the light emitted from the light source 31 to be incident to the light guide plate 20 or to allow the light exiting from the light guide plate 20 to be incident back to the light guide plate 20.

The optical sheet 15 may include a quantum dot sheet configured to improve color reproducibility by changing a wavelength of light. Quantum dots, which are semiconductor crystals with a size of several nanometers that emit light, may be dispersed and disposed in the quantum dot sheet. Quantum dots may receive blue light and generate light of various wavelengths, that is, all colors of visible light, depending on their size. The optical sheet 15 may include a diffusion sheet to offset the effect of the pattern of the light guide plate 20. The optical sheet 15 may include a reflective sheet 16 configured to improve the luminance by concentrating light.

The display apparatus 1 may include the chassis assembly configured to accommodate and support the liquid crystal panel 10 and the backlight unit. The chassis assembly may include a front chassis 80, a middle mold 85, and a rear chassis 90.

The front chassis 80 may have a rectangular frame shape on the front surface of the display apparatus 1. The front chassis 80 may include a bezel portion 81 forming a bezel and a rear extending portion 82 extending backward from the bezel portion 81.

The middle mold 85 may be coupled to the rear of the front chassis 80. The middle mold 85 may include a side portion 86 provided in a rectangular frame shape and an intermediate support portion 87 protruding from the side portion 86 to support the light guide plate 20 and the optical sheet 15.

The rear chassis 90 may have a substantially planar shape and may be coupled to the rear of the middle mold 85. The rear chassis 90 may be formed of a metal material such as aluminum or SUS having good thermal conductivity to dissipate heat generated from the light source 31 to the outside, or a plastic material such as ABS. The rear chassis 90 may include a base 91 disposed behind the light guide plate 20 and a front extending portion 92 extending forward from an edge of the base 91.

A rear cover forming a rear exterior of the display apparatus 1 may be coupled to the rear of the rear chassis 90. The aforementioned support leg 2 may be coupled to the rear cover.

However, in one or more embodiments, at least one of the front chassis 80, the middle mold 85, and the rear chassis 90 may be omitted.

The display apparatus 1 may include a heat dissipation member 100 configured to dissipate heat generated from the plurality of light sources 31 of the light source module 30.

The heat dissipation member 100 may be provided to be coupled to the rear chassis 90. The heat dissipation member 100 may be provided to receive heat generated from the light source module 30 and dissipate the heat of the light source module 30.

The rear chassis 90 may be provided to receive heat generated from the heat dissipation member 100 and dissipate the heat generated from the heat dissipation member 100.

A thermal expansion coefficient of a material forming the heat dissipation member 100 may be greater than a thermal expansion coefficient of a material forming the rear chassis 90.

A thermal conductivity of a material forming the heat dissipation member 100 may be greater than a thermal conductivity of a material forming the rear chassis 90.

The heat dissipation member 100 may be formed of aluminum. For example, the rear chassis 90 may be formed of a steel material such as a steel plate.

When the light source module 30 is driven, heat generated from the light source 31 may be transferred to the heat dissipation member 100, and thus the heat dissipation member 100 may be expanded due to the heat.

Because the heat dissipation member 100 is coupled to the rear chassis 90, the heat dissipation member 100 may be distorted when the heat dissipation member 100 is expanded due to the heat transferred from the light source module 30. At this time, as the heat dissipation member 100 is distorted, the heat dissipation member 100 may be expanded in the first direction X. Accordingly, the heat dissipation member 100 may press the reflective sheet 16 and the light guide plate 20, which are arranged in front of the heat dissipation member 100, in the first direction X, and thus the reliability of the display apparatus 1 may be reduced.

For example, when the reflective sheet 16 is deformed because the heat dissipation member 100 presses at least a portion of the reflective sheet 16 toward the first direction X due to the distortion of the heat dissipation member 100 caused by the expansion of the heat dissipation member 100, the uniformity of the light emitted to the liquid crystal panel 10 may be reduced and thus dark or bright areas may appear in a portion of the screen displayed on the liquid crystal panel 10.

For example, when a position of the light source module 30 connected to the heat dissipation member 100 is dislocated due to the distortion of the heat dissipation member 100 caused by the expansion of the heat dissipation member 100, an incident angle of light emitted to the light guide plate 20 may change. Accordingly, the uniformity of the light emitted to the liquid crystal panel 10 may be reduced and the amount of light may be reduced.

To prevent this, the heat dissipation member 100 may include a first heat dissipation member 110 in contact with the light source module 30 and a second heat dissipation member 120 spaced apart from the first heat dissipation member 110 with respect to a third direction Z perpendicular to the first direction X and the second direction Y. Accordingly, it is possible to prevent the expansion of the heat dissipation member 100 in the first direction X even when the heat is transferred to the heat dissipation member 100 from the light source module 30.

The heat dissipation member 100 will be described in detail later.

Figure 4:
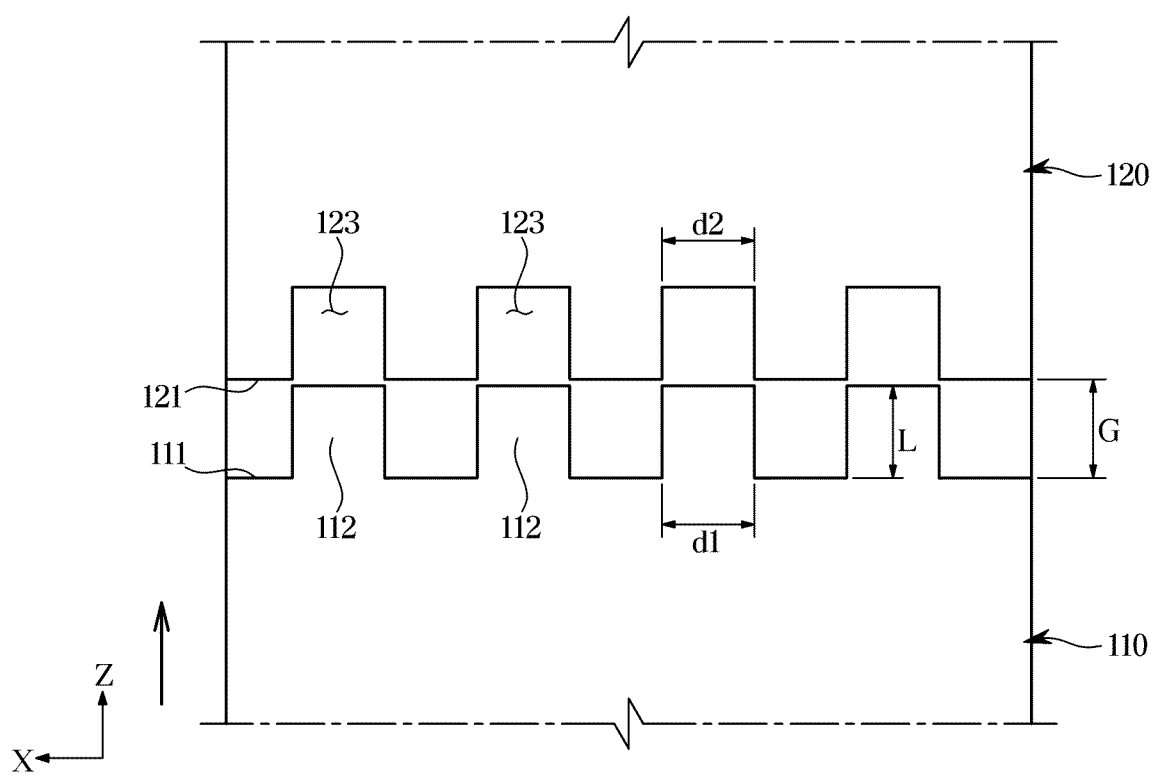
FIG. 4 is a cross-sectional view illustrating a state in which a heat dissipation member of the display apparatus is in a first position, according to an embodiment.
Figure 5:
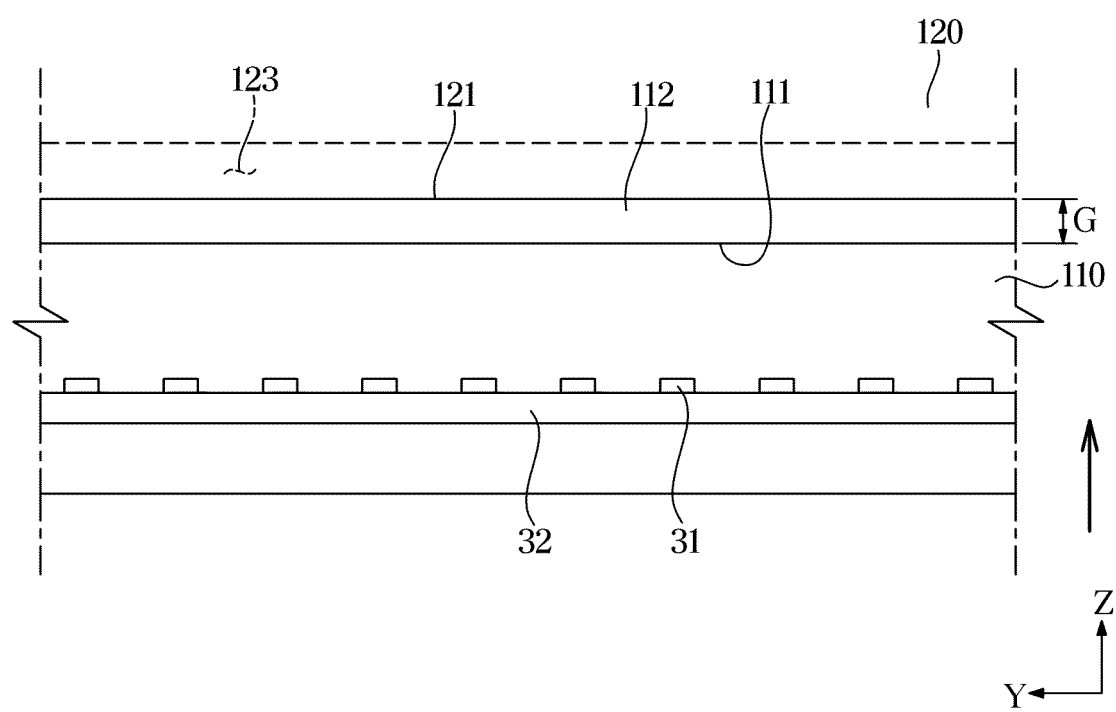
FIG. 5 is a front view illustrating a state in which the heat dissipation member of the display apparatus is in the first position, according to an embodiment.
Figure 6:
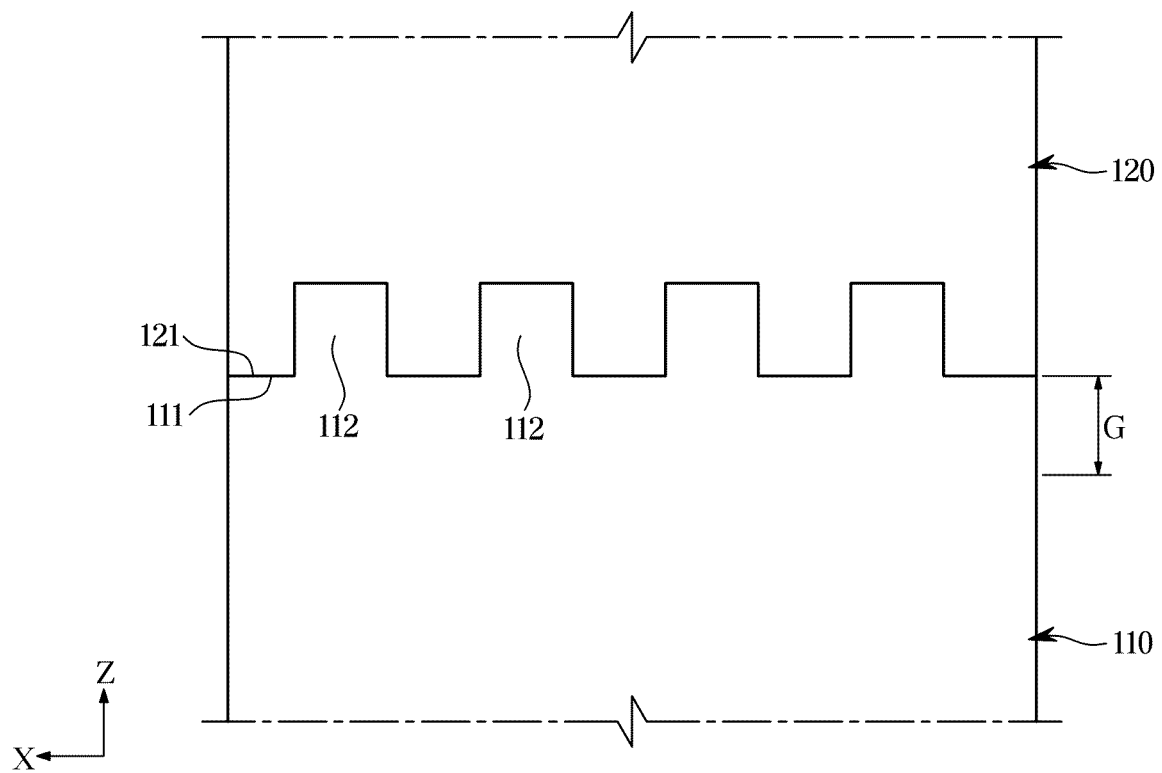
FIG. 6 is a cross-sectional view illustrating a state in which the heat dissipation member of the display apparatus is in a second position, according to an embodiment.
Figure 7:
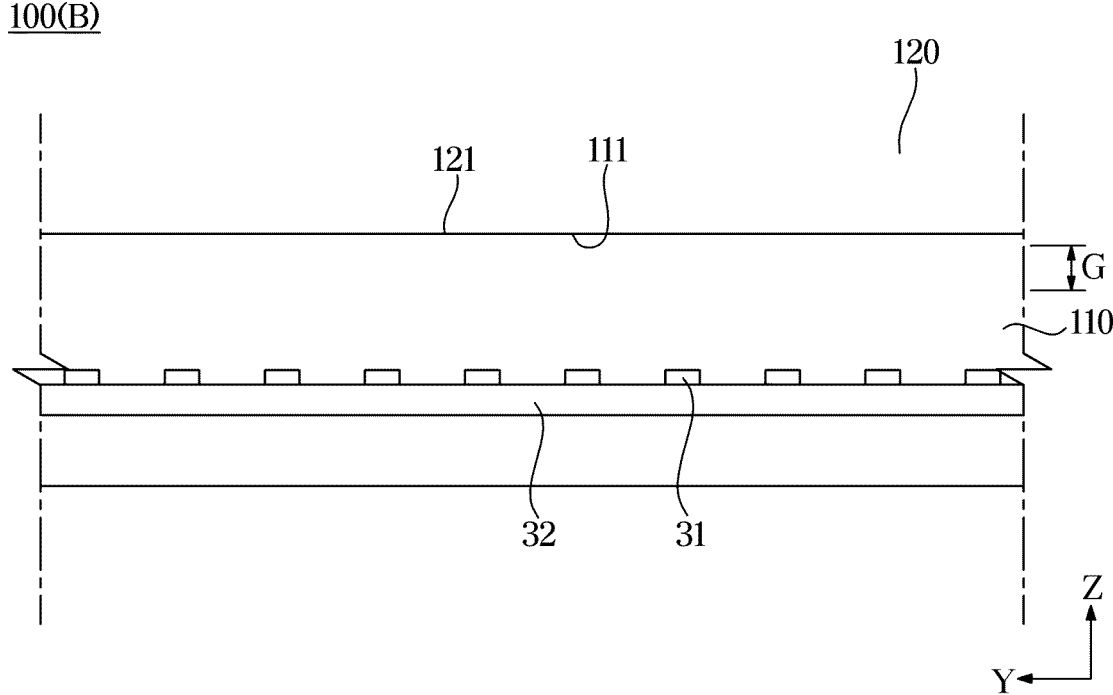
FIG. 7 is a front view illustrating a state in which the heat dissipation member of the display apparatus is in the second position, according to an embodiment.

FIG. 4 is a cross-sectional view illustrating a state in which a heat dissipation member of the display apparatus is in a first position, according to an embodiment. FIG. 5 is a front view illustrating a state in which the heat dissipation member of the display apparatus is in the first position, according to an embodiment. FIG. 6 is a cross-sectional view illustrating a state in which the heat dissipation member of the display apparatus is in a second position, according to an embodiment. FIG. 7 is a front view illustrating a state in which the heat dissipation member of the display apparatus is in the second position, according to an embodiment.

As illustrated in FIGS. 4 and 5, the heat dissipation member 100 may include the second heat dissipation member 120 spaced apart from the first heat dissipation member 110 in the third direction Z.

A gap G may exist between one end 111 of the first heat dissipation member 110 in the third direction Z and one end 121 of the second heat dissipation member 120 or one end 121 of the second heat dissipation member 120 adjacent to the first heat dissipation member.

The first heat dissipation member 110 and the second heat dissipation member 120 may be arranged to allow the gap G to be formed between the first heat dissipation member 110 and the second heat dissipation member 120 in the third direction Z.

The first heat dissipation member 110 and the second heat dissipation member 120 may each be fixed to the rear chassis 90. The first heat dissipation member 110 and the second heat dissipation member 120 may be independently fixed to the rear chassis 90.

The first heat dissipation member 110 may include a coupling portion 110a to which the light source module 30 is coupled, and an extending portion 110b extending from the coupling portion 110a by bending in the perpendicular direction.

The coupling portion 110a may be disposed to face one of the side surfaces 23, 24, 25, and 26 of the light guide plate 20. The extending portion 110b may be bent from the coupling portion 110a and extend from the rear of the reflective sheet 16 in the first direction X.

The coupling portion 110a may be disposed to face the lower side surface 24 of the light guide plate 20. The extending portion 110b may be provided to extend from a lower end of the coupling portion 110a in the first direction X toward the third direction Z.

The light source module 30 is coupled to the first heat dissipation member 110 and thus when heat is generated in the light source module 30, the heat may be transferred to the first heat dissipation member 110. Accordingly, the first heat dissipation member 110 may be expanded.

The first heat dissipation member 110 may be expanded in the third direction Z and may be in contact with the second heat dissipation member 120 spaced apart in the third direction Z. Accordingly, the heat generated in the light source module 30 may be transferred to the second heat dissipation member 120 through the first heat dissipation member 110, and the heat may be dissipated through the entire first heat dissipation member 110 and second heat dissipation member 120.

When the heat dissipation member 100 is a single or unitary piece, the heat dissipation member 100 may expand in the third direction Z due to the heat transferred from the light source module 30. Further, because the heat dissipation member 100 is fixed to the rear chassis 90, the heat dissipation member 100 may be distorted and bent toward the first direction X. Accordingly, the heat dissipation member 100 may press at least a portion of the reflective sheet 16 and the light guide plate 20, which are arranged in front of the heat dissipation member 100, and thus the reliability of the screen displayed on the display apparatus 1 may be reduced.

However, the heat dissipation member 100 includes the first heat dissipation member 110 and the second heat dissipation member 120, and the second heat dissipation member 120 is spaced apart from the first heat dissipation member 110 in the third direction Z. Accordingly, even when the heat is transferred to the heat dissipation member 100, the heat dissipation member 100 may dissipate heat without being distorted.

Even when the first heat dissipation member 110 is expanded in the third direction Z, the expansion of the first heat dissipation member 110 may not cause the distortion of the heat dissipation member 100 due to the gap G between the first heat dissipation member 110 and the second heat dissipation member 120. Further, the first heat dissipation member 110 may be expanded in the gap G in the third direction Z.

The first heat dissipation member 110 expanded in the third direction Z by a length of the gap G may be in contact with the second heat dissipation member 120, and the second heat dissipation member 120 may be expanded thermally by receiving the heat through the first heat dissipation member 110.

At this time, in a total expansion length of the heat dissipation member 100 in the third direction Z, an expansion length of the first heat dissipation member 110 may be offset by the gap G, and thus an expansion value of the entire heat dissipation member 100 in the third direction Z may be reduced. Accordingly, it is possible to prevent the distortion of the heat dissipation member 100 caused by the expansion thereof in the third direction Z.

The first heat dissipation member 110 may include a protrusion 112 arranged between the gap G between the one end 111 of the first heat dissipation member 110 and the one end 121 of the second heat dissipation member 120 with respect to the third direction Z.

The second heat dissipation member 120 may include a receiving portion 123 in which the protrusion 112 is accommodated in the third direction Z when the protrusion 112 is moved in the third direction Z due to the thermal expansion of the first heat dissipation member 110.

On the contrary, the second heat dissipation member 120 may include a protrusion and the first heat dissipation member 110 may include a receiving portion.

A state of the heat dissipation member 100 when the light source module 30 is not driven is a first state 100A, as illustrated in FIGS. 4 and 5, in which the protrusion 112 may be disposed in the gap G.

For example, a plurality of protrusions 112 may be provided. The plurality of protrusions 112 may be arranged to be spaced apart in the first direction X.

For example, a plurality of protrusions 123 may be provided according to the number of protrusions 112. The plurality of receiving portions 123 may be arranged to be spaced apart in the first direction X.

The protrusion 112 may protrude from the one end 111 of the first heat dissipation member 110 toward the third direction Z.

The receiving portion 123 may be formed to be accommodated inside the second heat dissipation member 120 in the third direction Z from the one end 121 of the second heat dissipation member 120.

A length L of the protrusion 112 in the third direction Z may be provided to approximately correspond to a length of the gap G in the third direction Z. For example, the length L of the protrusion 112 in the third direction Z may be less than or equal to the length of the gap G in the third direction Z.

Accordingly, when the heat dissipation member 100 is in the first state 100A, the protrusion 112 may be disposed inside the gap G and the entire protrusion 112 may be disposed inside the gap G in the first direction X. Therefore, a depth of the gap G in the first direction X from the rear side of the heat dissipation member may be reduced by the protrusion 112.

As described above, when the depth of the gap G in the first direction X, in which the reflective sheet 16 is disposed in front of the heat dissipation member 100 in the first direction X, is provided to be greater than a predetermined depth, a portion of the reflective sheet 16, which is disposed in the gap G in the first direction X, may be unstably supported and thus the arrangement of the reflective sheet 16 may be deformed. Further, a reflectance of light in a portion of the reflective sheet 16 disposed in the gap G may be different from a reflectance in other portions, and thus the uniformity of the amount of light emitted to the liquid crystal panel 10 may be reduced.

To prevent this, when the heat dissipation member 100 is in the first state 100A, the protrusion 112 may be disposed inside the gap G, and accordingly, the depth of the gap G in the first direction X may be minimized or reduced by the protrusion 112.

A distance d1 of the protrusion 112 in the first direction X may correspond to a distance d2 of the receiving portion 123 in the first direction X. For example, the distance d1 of the protrusion 112 in the first direction X may be less than or equal to the distance d2 of the receiving portion 123 in the first direction X.

A state in which the first heat dissipation member 110 is thermally expanded and comes into contact with the second heat dissipation member 120 when the light source module 30 is driven is a second state 100B of the heat dissipation member 100. When the heat dissipation member 100 is in the second state 100B as illustrated in FIGS. 6 and 7, a contact area between the first heat dissipation member 110 and the second heat dissipation member 120 may be maximized, and thus it is possible to effectively transfer the heat from the first heat dissipation member 110 to the second heat dissipation member 120.

When the heat dissipation member 100 is in the second state 100B, the one end 111 of the first heat dissipation member 110 and the one end 121 of the second heat dissipation member 120 may be in contact with each other.

When the heat dissipation member 100 is in the second state 100B, the protrusion 112 may be accommodated in the receiving portion 123, and the protrusion 112 may come contact into with the one end 121 of the second heat dissipation member 120 and a surface of the receiving portion 123 forming the receiving portion 123.

Hereinafter a heat dissipation member 200 according to an embodiment will be described. A configuration other than a protrusion 212 and a receiving portion 213 of a first heat dissipation member 210 and a protrusion 222 and a receiving portion 223 of a second heat dissipation member 220 described below is the same as the heat dissipation member 100, and thus a description thereof will be omitted.

Figure 8:
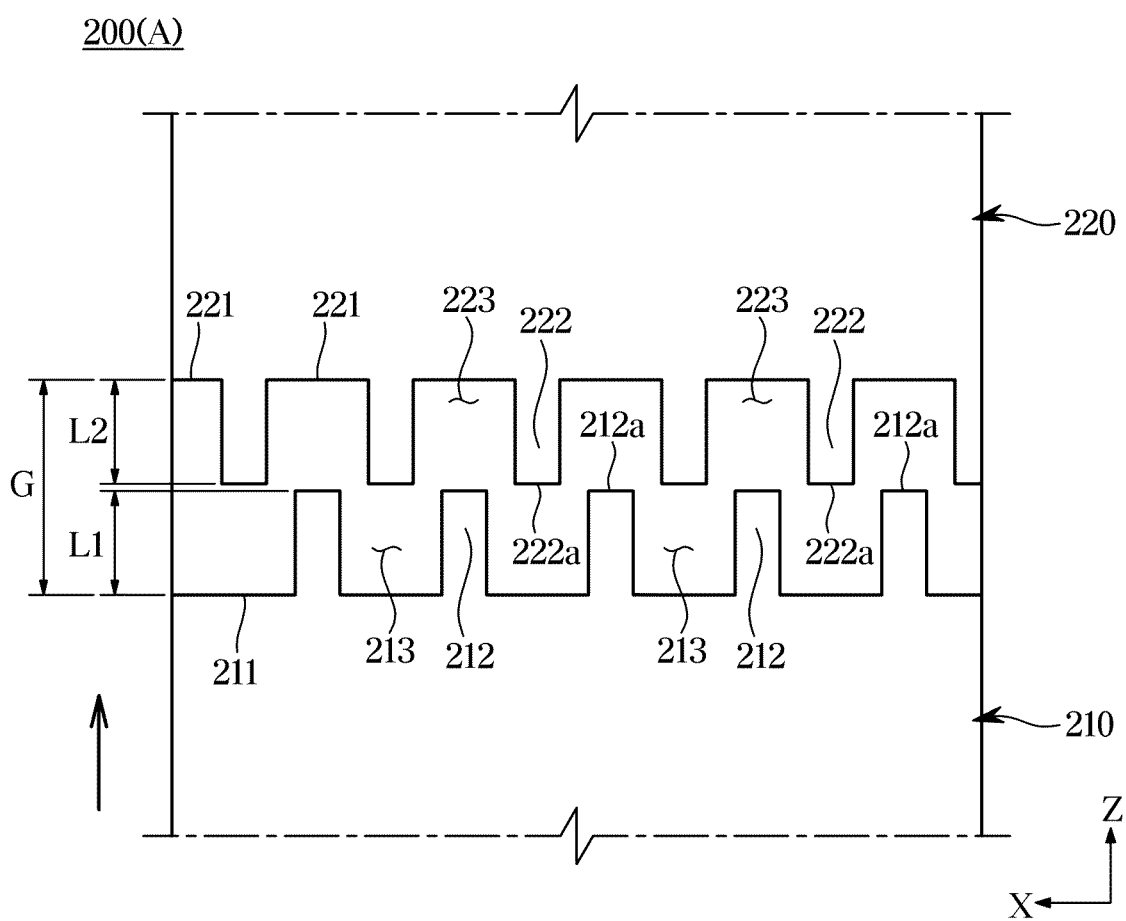
FIG. 8 is a cross-sectional view illustrating a state in which a heat dissipation member of the display apparatus is in a first position, according to an embodiment.
Figure 9:
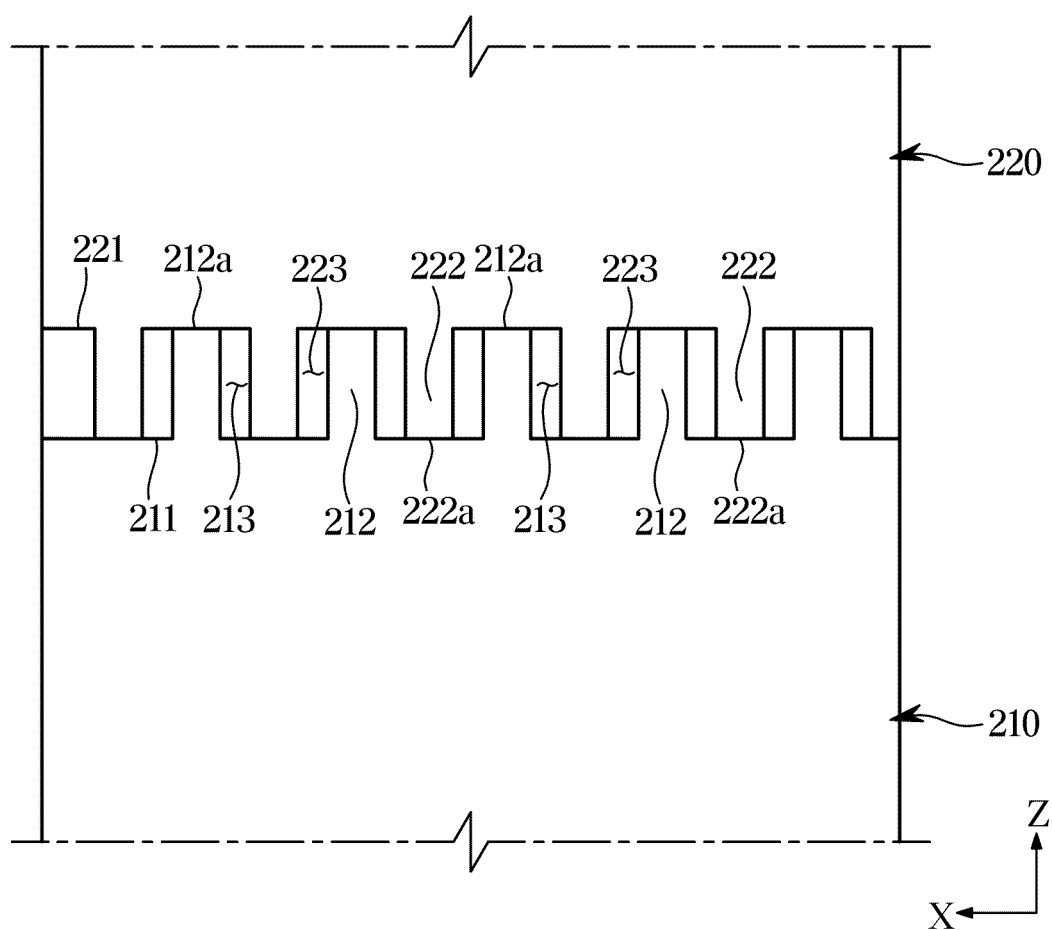
FIG. 9 is a cross-sectional view illustrating a state in which the heat dissipation member of the display apparatus is in a second position, according to an embodiment.

FIG. 8 is a cross-sectional view illustrating a state in which a heat dissipation member of the display apparatus is in a first position, according to an embodiment. FIG. 9 is a cross-sectional view illustrating a state in which the heat dissipation member of the display apparatus is in a second position, according to an embodiment.

The first heat dissipation member 210 may include a first protrusion 212 disposed between gap G between one end 211 of the first heat dissipation member 210 and one end 221 of the second heat dissipation member 220 in the third direction Z.

The second heat dissipation member 220 may include a second protrusion 222 disposed between the gap G between the one end 211 of the first heat dissipation member 210 and the one end 221 of the second heat dissipation member 220 in the third direction Z.

The first heat dissipation member 210 may include a first receiving portion 213 in which the second protrusion 222 is accommodated in a direction opposite to the third direction Z when the second protrusion 222 is moved in the third direction Z due to the thermal expansion of the second heat dissipation member 220.

The second heat dissipation member 220 may include a second receiving portion 223 in which the first protrusion 212 is accommodated in the third direction Z when the first protrusion 212 is moved in the third direction Z due to the thermal expansion of the first heat dissipation member 210.

In a state of the heat dissipation member 200 when the light source module 30 is not driven is a first state 200A, the first protrusion 212 and the second protrusion 222 may be disposed between the gap G.

For example, a plurality of first protrusions 212 may be provided. The plurality of first protrusions 212 may be spaced apart in the first direction X.

For example, a plurality of second protrusion 222 may be provided. The plurality of second protrusions 222 may be spaced apart in the first direction X.

For example, a plurality of first receiving portions 213 may be provided according to the number of second protrusions 222. The plurality of first receiving portions 213 may be spaced apart in the first direction X.

For example, a plurality of second receiving portions 223 may be provided according to the number of first protrusions 212. The plurality of second receiving portions 223 may be spaced apart in the first direction X.

The first protrusion 212 may protrude from the one end 211 of the first heat dissipation member 210 toward the third direction Z.

The second protrusion 222 may protrude from the one end 221 of the second heat dissipation member 220 toward a direction opposite to the third direction Z.

The first receiving portion 213 may be provided between the plurality of first protrusions 212.

The second receiving portion 223 may be provided between the plurality of second protrusions 222.

A length L1 of the first protrusion 212 in the third direction Z may be approximately equal to a length L2 of the second protrusion 222 in the third direction Z.

A sum of the length L1 of the first protrusion 212 in the third direction Z and the length L2 of the second protrusion 222 in the third direction Z may correspond to a length of the gap G in the third direction Z.

For example, the sum of the length L1 of the first protrusion 212 in the third direction Z and the length L2 of the second protrusion 222 in the third direction Z may be less than or equal to the length of the gap G in the third direction Z.

Accordingly, when the heat dissipation member 200 is in the first state 200A, the first protrusion 212 and the second protrusion 222 may be disposed in the gap G and the entire first protrusion 212 and second protrusion 222 may be disposed in the gap G along the first direction X. Therefore, a depth of the gap G in the first direction X may be minimized by the first protrusion 212 and the second protrusion 222.

A state in which the first heat dissipation member 210 is thermally expanded and comes into contact with the second heat dissipation member 220 when the light source module 30 is driven is a second state 200B of the heat dissipation member 200. When the heat dissipation member 200 is in the second state 200B, as illustrated in FIG. 9, the one end 211 of the first heat dissipation member 210 and the second protrusion 222 of the second heat dissipation member 120 may be in contact with each other, and the one end 221 of the second heat dissipation member 220 and the first protrusion 212 of the first heat dissipation member 220 may be in contact with each other.

When the heat dissipation member 200 is in the second state 200B, the first protrusion 212 of the first heat dissipation member 210 may be accommodated in the second receiving portion 223 of the second heat dissipation member 220 in the third direction Z, and the second protrusion 222 of the second heat dissipation member 220 may be accommodated in the first receiving portion 213 of the first heat dissipation member 210 in the opposite direction to the third direction Z.

The one end 211 of the first heat dissipation member 210 and the second protrusion 222 of the second heat dissipation member 120 may be in contact with each other, and the one end 221 of the second heat dissipation member 220 and the first protrusion 212 of the first heat dissipation member 220 may be in contact with each other. Accordingly, the heat of the first heat dissipation member 210 may be transferred to the second heat dissipation member 220.

The display apparatus according to an embodiment may include the liquid crystal panel 10 provided to display an image in the first direction X, the light guide plate 20 arranged behind the liquid crystal panel 10 with respect to a direction opposite to the first direction X, the light source module 30 including the plurality of light sources 31 disposed adjacent to a side surface of the light guide plate 20 to emit light toward the side surface of the light guide plate 20 and arranged along the second direction Y perpendicular to the first direction X, the rear chassis 90 disposed behind the light guide plate with respect to the direction opposite to the first direction, and the heat dissipation member 100 configured to dissipate heat generated from the light source module and coupled to the rear chassis.

The heat dissipation member may include the first heat dissipation member 110 in contact with the light source module, and the second heat dissipation member 120 spaced apart from the first heat dissipation member in the third direction Z perpendicular to the first and second directions.

According to an embodiment, the heat dissipation member 100 may include the first heat dissipation member 110 and the second heat dissipation member 120, and the second heat dissipation member 120 may be spaced apart from the first heat dissipation member 110 in the third direction Z. Accordingly, even when the heat is transferred to the heat dissipation member 100, the heat dissipation member 100 may dissipate the heat without being distorted.

The first heat dissipation member may include the protrusion 112 disposed between gaps G between the one end 111 of the first heat dissipation member and the one end 121 of the second heat dissipation member in the third direction.

The second heat dissipation member may include the receiving portion 123 provided to accommodate the protrusion in the third direction in response to the protrusion being moved in the third direction.

The protrusion may be provided to extend from the one end of the first heat dissipation member toward the third direction.

The receiving portion may be formed from the one end of the second heat dissipation member to an inside of the second heat dissipation member in the third direction.

The length L of the protrusion from the one end of the first heat dissipation member to the third direction may correspond to a length of the gap.

According to an embodiment, when the heat dissipation member 100 is in the first state 100A, the protrusion 112 may be disposed inside the gap G and the entire protrusion 112 may be disposed inside the gap G in the first direction X. Therefore, a depth of the gap G in the first direction X may be minimized by the protrusion 112.

The distance d1 of the protrusion in the first direction may correspond to the distance d2 of the receiving portion in the first direction.

According to an embodiment, the contact area between the first heat dissipation member 110 and the second heat dissipation member 120 may be maximized, and thus it is possible to effectively transfer the heat from the first heat dissipation member 110 to the second heat dissipation member 120.

The distance d1 of the protrusion in the first direction may be less than the distance d2 of the receiving portion in the first direction.

The protrusion may be provided in plurality, and the plurality of protrusions may be arranged to be spaced apart in the first direction.

The receiving portion may be provided in plurality, and the plurality of receiving portions may be arranged to be spaced apart in the first direction.

The plurality of receiving portions may be disposed at positions corresponding to the plurality of protrusions in the third direction.

According to an embodiment, the contact area between the first heat dissipation member 110 and the second heat dissipation member 120 may be maximized, and thus it is possible to effectively transfer the heat from the first heat dissipation member 110 to the second heat dissipation member 120.

The first heat dissipation member and the second heat dissipation member may be each individually coupled to the rear chassis.

According to an embodiment, the first heat dissipation member may be in contact with the second heat dissipation member in response to the thermal expansion of the first heat dissipation member.

The first heat dissipation member may include the coupling portion to which the light source module is coupled, and the extending portion provided to be bent and extend from the coupling portion in the third direction.

The second heat dissipation member may be arranged to be spaced apart from one end of the extending portion of the first heat dissipation member in the third direction.

The thermal expansion coefficient of the heat dissipation member may be greater than the thermal expansion coefficient of the rear chassis.

According to an embodiment, even when the heat is transferred to the rear chassis provided to support the heat dissipation member, the shape of the rear chassis may be maintained, thereby preventing the distortion of the display apparatus.

The first heat dissipation member may include the protrusion disposed between gaps between one end of the first heat dissipation member and one end of the second heat dissipation member in the third direction.

The second heat dissipation member may include the protrusion disposed between the gaps between one end of the first heat dissipation member and one end of the second heat dissipation member in a direction opposite to the third direction.

The protrusion of the first heat dissipation member may be provided to be in contact with the one end of the second heat dissipation member in response to the protrusion of the first heat dissipation member being moved in the third direction.

The protrusion of the first heat dissipation member and the protrusion of the second heat dissipation member may be provided in plurality.

The first heat dissipation member may include the receiving portion disposed between the plurality of protrusions in the third direction.

The second heat dissipation member may include the receiving portion disposed between the plurality of protrusions in the third direction.

In response to the plurality of protrusions of the first heat dissipation member being moved in the third direction, the plurality of protrusions of the first heat dissipation member may be accommodated in the receiving portion of the second heat dissipation member in the third direction, and the plurality of protrusions of the second heat dissipation member may be accommodated in the receiving portion of the first heat dissipation member in a direction opposite to the third direction.

According to an embodiment, the protrusion of the first heat dissipation member and the protrusion of the second heat dissipation member may be in contact with the second heat dissipation member and the first heat dissipation member, respectively, and thus the heat of the first heat dissipation member may be transferred to the second heat dissipation member.

The display apparatus, according to an embodiment, may include the liquid crystal panel 10 provided to display an image in the first direction X, the light guide plate 20 arranged behind the liquid crystal panel 10 with respect to a direction opposite to the first direction X, the light source module 30 including the plurality of light sources 31 disposed adjacent to a side surface of the light guide plate 20 to emit light toward the side surface of the light guide plate 20 and arranged along the second direction Y perpendicular to the first direction X, the rear chassis 90 disposed behind the light guide plate with respect to the direction opposite to the first direction, and the heat dissipation member 100 configured to dissipate heat generated from the light source module and coupled to the rear chassis.

The heat dissipation member may include the first heat dissipation member 110 in contact with the light source module, and the second heat dissipation member 120 spaced apart from the first heat dissipation member in the third direction Z perpendicular to the first and second directions.

The first heat dissipation member may include the coupling portion 110a to which the light source module is coupled, and the extending portion 110b provided to be bent and extend from the coupling portion in the third direction.

The extending portion may be thermally deformed to be in contact with the second heat dissipation member in the third direction in response to the light source module being driven.

The first heat dissipation member may include the protrusion 112 disposed between gaps G between the one end 111 of the first heat dissipation member and the one end 121 of the second heat dissipation member in the third direction.

The second heat dissipation member may include the receiving portion 123 provided to accommodate the protrusion in the third direction in response to the protrusion being moved in the third direction.

The protrusion may be provided to extend from the one end of the first heat dissipation member toward the third direction.

The receiving portion may be formed from the one end of the second heat dissipation member to an inside of the second heat dissipation member in the third direction.

The length L of the protrusion from one end of the first heat dissipation member to the third direction may correspond to a length of the gap.

The display apparatus according to an embodiment may include the liquid crystal panel 10 provided to display an image in the first direction X, the light guide plate 20 arranged behind the liquid crystal panel 10 with respect to a direction opposite to the first direction X, the light source module 30 including the plurality of light sources 31 disposed adjacent to a side surface of the light guide plate 20 to emit light toward the side surface of the light guide plate 20 and arranged along the second direction Y perpendicular to the first direction X, the rear chassis 90 disposed behind the light guide plate with respect to the direction opposite to the first direction, and the heat dissipation member 100 configured to dissipate heat generated from the light source module and coupled to the rear chassis.

The heat dissipation member may include the first heat dissipation member 110 in contact with the light source module, and the second heat dissipation member 120 spaced apart from the first heat dissipation member in the third direction Z perpendicular to the first and second directions.

The first heat dissipation member may include the protrusion 112 disposed between gaps G between the one end 111 of the first heat dissipation member and the one end 121 of the second heat dissipation member in the third direction.

The second heat dissipation member may include the receiving portion 123 provided to accommodate the protrusion in the third direction in response to the protrusion being moved in the third direction.

Although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A display apparatus comprising:
a liquid crystal panel configured to display an image;
a light guide plate provided behind the liquid crystal panel in a first direction;
a light source module adjacent to a side surface of the light guide plate, the light source module comprising a plurality of light sources arranged in a second direction perpendicular to the first direction and configured to emit light toward the side surface of the light guide plate;
a rear chassis provided behind the light guide plate in the first direction; and
a heat dissipation member coupled to the rear chassis and configured to dissipate heat generated by the light source module,
wherein the heat dissipation member comprises:
a first heat dissipation member contacting the light source module; and
a second heat dissipation member,
wherein an end of the first heat dissipation member and an end of the second heat dissipation member are aligned side by side in a third direction perpendicular to the first direction and the second direction,
wherein the end of the first heat dissipation member and the end of the second heat dissipation member are separated by a gap in the third direction, in a first state, and
wherein the end of the first heat dissipation member is configured to move toward the end of the second heat dissipation member in the third direction, so as to be in contact with the end of the second heat dissipation member in a second state.

2. The display apparatus of claim 1, wherein the first heat dissipation member comprises a protrusion provided in the gap between the end of the first heat dissipation member and the end of the second heat dissipation member in the third direction.

3. The display apparatus of claim 2, wherein the second heat dissipation member comprises a receiving portion configured to accommodate the protrusion in the second state in which the protrusion moved in the third direction.

4. The display apparatus of claim 3, wherein the protrusion extends from the end of the first heat dissipation member in the third direction; and
wherein the receiving portion is recessed from the end of the second heat dissipation member toward an inside of the second heat dissipation member in the third direction.

5. The display apparatus of claim 4, wherein a length of the protrusion in the third direction corresponds to a length of the gap.

6. The display apparatus of claim 4, wherein a width of the protrusion in the first direction corresponds to a width of the receiving portion in the first direction.

7. The display apparatus of claim 4, wherein a width of the protrusion in the first direction is less than a width of the receiving portion in the first direction.

8. The display apparatus of claim 3, wherein the first heat dissipation member comprises a plurality of protrusions spaced apart from each other in the first direction,
wherein the second heat dissipation member comprises a plurality of receiving portions spaced apart from each other in the first direction, and
wherein positions of the plurality of receiving portions correspond to positions of the plurality of protrusions in the third direction.

9. The display apparatus of claim 1, wherein each of the first heat dissipation member and the second heat dissipation member is independently coupled to the rear chassis.

10. The display apparatus of claim 1, wherein the first heat dissipation member comprises a coupling portion which is coupled to the light source module; and
an extending portion which extends from the coupling portion in the third direction and is aligned with the second heat dissipation member in the third direction, and
wherein the end of the first heat dissipation member is an end of the extending portion, and the end of the second heat dissipation member is spaced apart from the end of the extending portion of the first heat dissipation member in the third direction.

11. The display apparatus of claim 1, wherein a thermal expansion coefficient of the heat dissipation member is greater than a thermal expansion coefficient of the rear chassis.

12. The display apparatus of claim 1, wherein the first heat dissipation member comprises a protrusion between gaps between the end of the first heat dissipation member and the end of the second heat dissipation member in the third direction; and
wherein the second heat dissipation member comprises a protrusion between gaps between the end of the first heat dissipation member and the end of the second heat dissipation member.

13. The display apparatus of claim 12, wherein the protrusion of the first heat dissipation member is configured to contact the end of the second heat dissipation member in the second state in which the protrusion of the first heat dissipation member moved in the third direction.

14. The display apparatus of claim 12, wherein the first heat dissipation member comprises a plurality of protrusions and a plurality of receiving portions between the plurality of protrusions; and
wherein the second heat dissipation member comprises a plurality of protrusions and a plurality of receiving portions between the plurality of protrusions.

15. The display apparatus of claim 14, wherein, in the second state in which the plurality of protrusions of the first heat dissipation member moved in the third direction, the plurality of protrusions of the first heat dissipation member is accommodated in the plurality of receiving portions of the second heat dissipation member, and the plurality of protrusions of the second heat dissipation member is accommodated in the plurality of receiving portions of the first heat dissipation member.

* * * * *